GEORGE W. STEVENS & JOHN GRAY.
Fruit Drier.

No. 125,703. Patented April 16, 1872.

Witnesses.
John Smith
Philip Mahler

Inventor.
Geo. W. Stevens
John Gray
By their Attorney
Geo. W. Strong 125,703

UNITED STATES PATENT OFFICE.

GEORGE W. STEVENS AND JOHN GRAY, OF SAN FRANCISCO, CALIFORNIA, ASSIGNORS TO SAID STEVENS.

IMPROVEMENT IN FRUIT-DRIERS.

Specification forming part of Letters Patent No. 125,703, dated April 16, 1872.

SPECIFICATION.

*To all whom it may concern:*

Be it known that we, GEORGE W. STEVENS and JOHN GRAY, of San Francisco, in the county of San Francisco and State of California, have invented an Improved Fruit and Vegetable Desiccator; and we do hereby declare that the following is a full and exact description of the same, reference being had to the accompanying drawing and to the letters of reference marked thereon.

This invention has for its object the production of an improved apparatus for drying fruit, &c.; and consists in the peculiar construction of the same, as will be fully described hereinafter.

Figure 1:
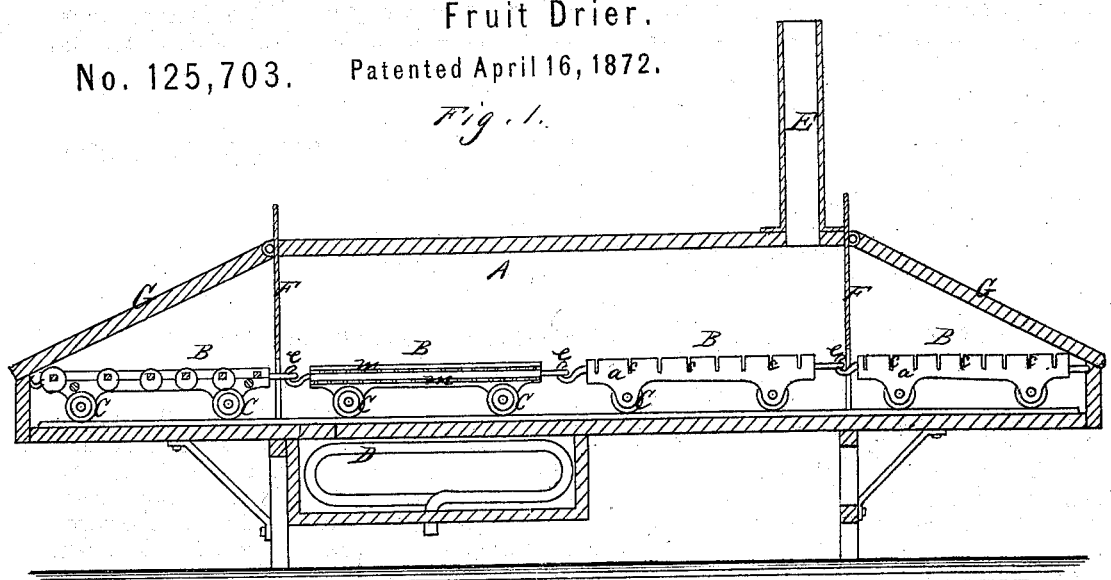
Figure 2:
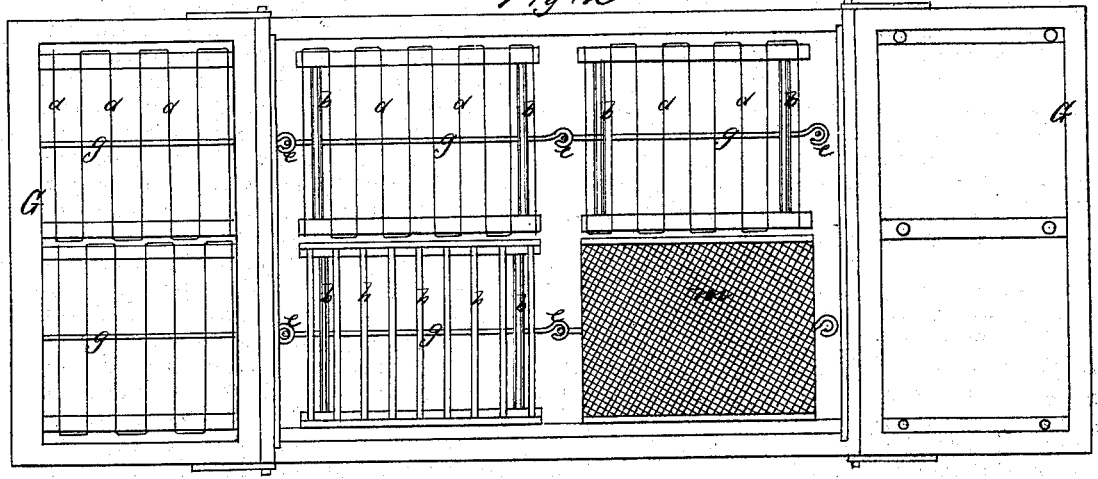
Figure 3:
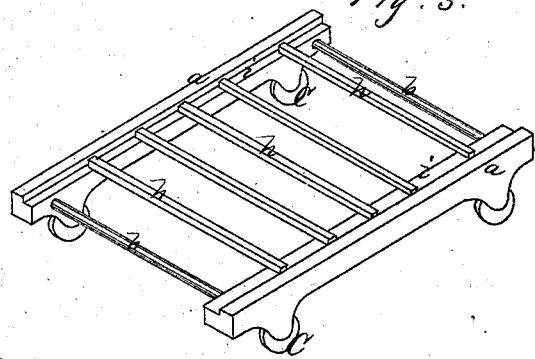

Referring to the accompanying drawing for a more complete explanation of my invention, Figure 1 is a vertical section, and Fig. 2 a plan.

A is a suitable box or close case of convenient length—usually about sixty feet—and eight feet wide. This chamber may be inclined, or it may be made level, a suitable track or way being constructed on the floor for two series of cars, B, which are mounted on small wheels or casters, C. Beneath the floor of the chamber, near one end, we place coils of steam-pipe D, which connect with a boiler, and by the circulation of the steam a current of hot air is induced, flowing over the surface of the pipes, and thence being introduced to the chamber by suitable passages.

If found desirable, a pump or the exhaust of a hot-air engine may be employed to increase the flow of hot air and the capacity of the machine; but it is probable that this will not be necessary, as too great an amount of heat will cause the fruit to become scalded.

The cars B are constructed about four feet square, and have sides *a* formed of wood or other suitable material. Rods *b* of sufficient size are formed with a shoulder, so as to prevent the sides from being crushed in; and these rods extend across from side to side, as shown. Narrow slots *c* are cut in the sides, and slender wires *d* are stretched across from side to side, so as to form transverse lines, as shown. In place of these wires we employ slender rods of wood *h*, which are preferably made square. These are taken out and the apples or other fruit, which is cored, pared, and sliced spirally at one operation, is slipped over the end of the rod till it is nearly full. A knife is then drawn across the top, thus separating the slices, which are moved just far enough apart to allow the heat to pass freely. If the wires are employed, the fruit is cored and sliced. The slices are placed upon the wires, standing edgewise, so as to be as close together as possible, and at the same time allow free circulation of the hot air. In this manner we are enabled to utilize thoroughly all the room.

The cars are strengthened by a stout double wire or rod, *g*, running beneath the car, and formed into a loop, *e*, or other connection at each end, so that the cars can be connected in a line. The escape-chimney E at the upper end may have a steam-pipe enter it to increase the draught, if necessary. At the upper end, and also at the lower or discharge end, is a vertically-sliding door, F, which prevents the cars or heat from coming out. An inclined glazed door, G, is placed outside the door F and hinged, so that through this the cars can be seen and seized with a hook and drawn out through the vertical door, which is closed behind the car. The glazed door is then opened and the car run out without allowing any cold air to enter the chamber. The action at the upper or feeding end is similar, the rods or wires of a car being loaded and the car placed in readiness beneath the glazed door.

When a car of dried fruit is ready to be drawn out at the lower end, the sliding door at the upper end is also raised and the fresh car passes in, so that the succession is always kept up. By this arrangement we are enabled to provide a fruit-drier which utilizes all the space and heat.

When we desire to dry berries and small fruits, we lay two or more screens, *m m*, one above the other, upon the wire *d*, the rods *h*, or upon the longitudinal side strips *i i*, which are used to support the rods *h*, so as to utilize the whole space.

Among the advantages secured by the employment of cars over the aprons or other similar devices ordinarily employed are, first, that no machinery is required, the cars moving easily by hand; second, the cars can be allowed to stand until the fruit is as dry as necessary, and by means of the glazed or other inclined doors the fruit can be examined, and, if not sufficiently dry, can be returned, and this without permitting the ingress of cold air; third, when a car is removed, its load can be set aside to cool before packing; and in the case of berries, the trays or screens may be set upon racks for an hour or two before packing or disturbing them at all; but when an apron is employed it must be moved slowly all the time, and when the fruit arrives at the discharge-end it must be discharged and a receptacle provided for it, thus necessitating the packing or disturbing of the fruit before it is perfectly cool, which is very detrimental to it.

Having described our invention, what we claim, and desire to secure by Letters Patent, is—

1. The drying apparatus described, consisting of the chamber A, sliding partitions F, and hinged and glazed doors G, and the heating-chamber, as and for the purpose described.

2. The car B, provided with slots c, adapted to receive the line of fruit-laden wire, as and for the purpose set forth.

In witness whereof we have hereunto set our hands.

GEO. W. STEVENS.
JOHN GRAY.

Witnesses:
H. S. TIBBEY,
GEO. H. STRONG.